(12) United States Patent
Ee et al.

(10) Patent No.: US 11,410,693 B2
(45) Date of Patent: Aug. 9, 2022

(54) MICRO-DUAL STAGE ACTUATED GIMBAL DESIGN

(71) Applicant: Magnecomp Corporation, Murrieta, CA (US)

(72) Inventors: Kuen Chee Ee, Chino, CA (US); Long Zhang, Murrieta, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/931,412

(22) Filed: May 13, 2020

(65) Prior Publication Data

US 2020/0372930 A1 Nov. 26, 2020

Related U.S. Application Data

(60) Provisional application No. 62/852,783, filed on May 24, 2019.

(51) Int. Cl.
*G11B 5/596* (2006.01)
*G11B 5/48* (2006.01)
*G11B 5/55* (2006.01)

(52) U.S. Cl.
CPC .............. *G11B 5/483* (2015.09); *G11B 5/486* (2013.01); *G11B 5/5552* (2013.01); *G11B 5/596* (2013.01); *G11B 5/4846* (2013.01)

(58) Field of Classification Search
None
See application file for complete search history.

(56) References Cited

U.S. PATENT DOCUMENTS

| 8,964,334 B2 | 2/2015 | Takikawa et al. | |
|---|---|---|---|
| 2011/0096438 A1 | 4/2011 | Takada et al. | |
| 2012/0087041 A1* | 4/2012 | Ohsawa | G11B 5/483 360/234.5 |
| 2012/0099226 A1* | 4/2012 | Zambri et al. | G11B 5/483 360/245.3 |
| 2014/0022670 A1* | 1/2014 | Takikawa et al. | G11B 5/483 360/234.4 |
| 2014/0022671 A1* | 1/2014 | Takikawa et al. | G11B 5/483 360/234.6 |
| 2014/0022674 A1* | 1/2014 | Takikawa et al. | G11B 5/483 360/244.5 |

(Continued)

*Primary Examiner* — Craig A. Renner
(74) *Attorney, Agent, or Firm* — DLA Piper LLP (US)

(57) ABSTRACT

A flexure assembly is described. The flexure assembly includes a gimbal portion on configured to receive a slider. The gimbal portion includes a first surface and a second surface which is opposite to the first surface. The slider is mounted on the second surface. The flexure assembly also includes a pair of microactuator elements. The flexure assembly also includes a tongue of the gimbal portion on which the slider is mounted. The tongue includes a dimple point which represents the center of the tongue. The flexure assembly also includes a pair of first supporting portions and a pair of second supporting portions of the gimbal portion. A pair of end portions are individually secured to the tongue and the first supporting portions and the pair of second supporting portions. The flexure assembly also includes a conductive circuit portion unsupported between a first stationary part and the pair of end portions.

18 Claims, 7 Drawing Sheets

(56) References Cited

U.S. PATENT DOCUMENTS

| | | | |
|---|---|---|---|
| 2014/0022675 A1* | 1/2014 | Hanya et al. | G11B 5/483 360/244.5 |
| 2014/0085754 A1* | 3/2014 | Hanya et al. | G11B 5/483 360/244.5 |
| 2014/0085755 A1* | 3/2014 | Hanya et al. | G11B 5/483 360/244.5 |
| 2014/0104722 A1* | 4/2014 | Wright et al. | G11B 5/483 360/294.4 |
| 2014/0160599 A1* | 6/2014 | Higuchi et al. | G11B 5/483 360/294.4 |
| 2014/0168813 A1* | 6/2014 | Tao et al. | G11B 5/483 360/75 |
| 2014/0347765 A1* | 11/2014 | Miller et al. | G11B 5/483 360/245.7 |
| 2014/0368954 A1* | 12/2014 | Inoue et al. | G11B 5/4853 360/234.5 |
| 2015/0055253 A1* | 2/2015 | Takikawa et al. | G11B 5/4826 360/246.2 |
| 2015/0138739 A1* | 5/2015 | Hishiki | G11B 5/4826 361/760 |
| 2015/0187377 A1* | 7/2015 | Fujimura | G11B 5/483 360/244.1 |
| 2016/0035968 A1* | 2/2016 | Sakakura et al. | G11B 5/4873 29/25.35 |
| 2020/0279579 A1* | 9/2020 | Nakayama et al. | G11B 5/486 |

* cited by examiner

MICRO-DUAL STAGE ACTUATED GIMBAL DESIGN

CROSS-REFERENCE TO RELATED APPLICATIONS

This application claims priority from U.S. Provisional Patent Application No. 62/852,783, filed on May 24, 2019, which is hereby incorporated by reference in its entirety.

FIELD

Embodiments of the disclosure relate to the field of suspension devices for disk drives. More particularly, this disclosure relates to the field of dual stage actuated gimbal configurations for a suspension device.

BACKGROUND

A typical disk drive unit includes a spinning magnetic disk containing a pattern of magnetic storage medium ones and zeroes. The pattern of magnetic storage medium ones and zeroes constitutes the data stored on the disk drive. The magnetic disk is driven by a drive motor. The disk drive unit also includes a disk drive suspension to which a magnetic read/write head is mounted proximate a distal end of load beam. The "proximal" end of a suspension or load beam is the end that is supported, i.e., the end nearest to the base plate which is swaged or otherwise mounted to an actuator arm. The "distal" end of a suspension or load beam is the end that is opposite the proximal end, i.e., the "distal" end is the cantilevered end.

The suspension is coupled to an actuator arm, which in turn is coupled to a voice coil motor that moves the suspension arcuately in order to position the head slider over the correct data track on the data disk. The head slider is carried on a gimbal which allows the slider to pitch and roll so that it follows the proper data track on the disk, allowing for such variations as vibrations of the disk, inertial events such as bumping, and irregularities in the disk's surface.

In a DSA suspension a small actuator located on the suspension moves the head slider in order to position the head slider over the correct data track. The actuator provides both finer positioning of the head slider than does the voice coil motor, and provides higher servo bandwidth than does the voice coil motor. The actuator may be located in various places on the suspension depending on the particular DSA suspension design. Typically, left- and right-side actuators act in push-pull fashion to rotate the load beam or the distal end of the load beam.

SUMMARY

A flexure assembly is provided herein. The flexure assembly includes a gimbal portion on which a slider is mounted. The gimbal portion includes a first surface and a second surface which is opposite to the first surface. The slider is mounted on the second surface. The flexure assembly also includes a pair of microactuator elements. Each of the pair of microactuator elements being disposed on a respective side of the slider and each includes a first end portion and a second end portion. The microactuator elements are mounted to the second surface. The flexure assembly also includes a tongue of the gimbal portion on which the slider is mounted. The tongue includes a dimple point which represents the center of the tongue. The flexure assembly also includes a pair of first supporting portions and a pair of second supporting portions of the gimbal portion. A pair of end portions are individually secured to the tongue and the first supporting portions and the pair of second supporting portions. The flexure assembly also includes a conductive circuit portion unsupported between a first stationary part and the pair of end portions.

In some embodiments, the conductive circuit portion includes a conductor connected to an element of the slider. The conductor is configured to connect to electrodes of the pair of microactuator elements. The first surface is configured to face a load beam. The slider, the microactuator elements, and the conductive circuit portion are all disposed on the second surface, away from the load beam.

A disk drive suspension is also provided. The disk drive suspension includes a load beam and a flexure assembly. The load beam includes a first stationary part and a dimple. The flexure assembly includes a gimbal portion. The gimbal portion includes a first surface and a second surface which is opposite to the first surface. The first surface faces the load beam. The flexure assembly also includes a tongue of the gimbal portion. The tongue includes a dimple point. The dimple point is on a first axis which passes through a center of the dimple of the load beam. The flexure assembly also includes a pair of first supporting portions and a pair of second supporting portions of the gimbal portion, to which a pair of end portions are individually secured to the tongue. The flexure assembly also includes a conductive circuit portion unsupported between the first stationary part and the pair of end portions.

In some embodiments, the pair of first supporting portions are individually secured and supported by a first stationary part. The pair of second supporting portions are individually secured and supported by a second stationary part. The pair of end portions can be U-shaped. The tongue includes a fixed first tongue portion, a movable second tongue portion, and a movable third tongue portion. The tongue also includes a first hinge portion formed between the fixed first tongue portion and the movable second tongue portion. The tongue further includes a second hinge portion formed between the movable second tongue portion and the movable third tongue portion.

BRIEF DESCRIPTION OF THE DRAWINGS

In order to describe the manner in which the advantages and features of the disclosure can be obtained, embodiments of the present disclosure are described with reference to specific examples illustrated in the appended drawings. These drawings depict only example aspects of embodiments of the present disclosure, and are therefore not to be considered as limiting of its scope. The principles are described and explained with additional specificity and detail through the use of the following drawings.

DETAILED DESCRIPTION

The embodiments of the present disclosure are described with reference to the attached figures, wherein like reference numerals are used throughout the figures to designate similar or equivalent elements. The figures are not drawn to scale, and they are provided as exemplary illustrations. Several aspects of the embodiments are described below with reference to example applications, which are not intended to limit the scope of this disclosure. It should be understood that numerous specific details, relationships, and methods are set forth to provide a full understanding of the embodiments.

Embodiments described herein are directed to a flexure assembly. The flexure assembly includes a gimbal portion on which a slider is mounted. The gimbal portion includes a first surface and a second surface which is opposite to the first surface. The slider is mounted on the second surface. The flexure assembly also includes a pair of microactuator elements. Each of the pair of microactuator elements being disposed on a respective side of the slider and each includes a first end portion and a second end portion. The microactuator elements are mounted to the second surface. The flexure assembly also includes a tongue of the gimbal portion on which the slider is mounted. The tongue includes a dimple point, which represents the point of alignment of the flexure assembly with a dimple of a load beam. The flexure assembly also includes a pair of first supporting portions and a pair of second supporting portions of the gimbal portion. A pair of end portions are individually secured to the tongue and the first supporting portions and the pair of second supporting portions. The flexure assembly also includes a conductive circuit portion unsupported between a first stationary part and the pair of end portions.

Figure 1:
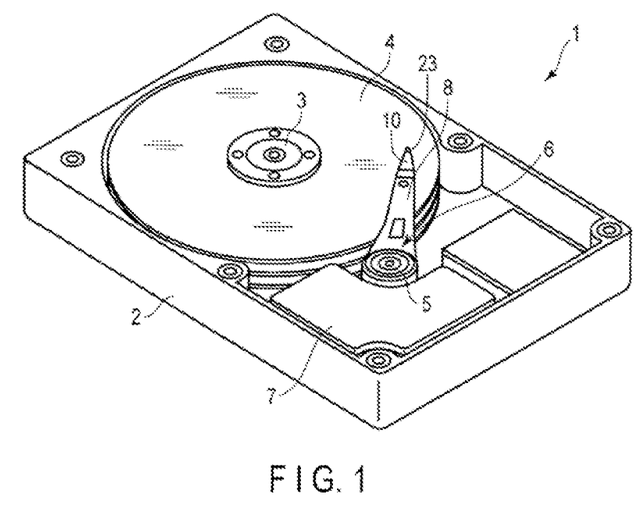
FIG. 1 is a perspective view showing a disk drive including a suspension in accordance with an embodiment of the disclosure.

FIG. 1 is a perspective view showing a disk drive 1, in accordance with an embodiment of the disclosure. The disk drive 1 can include a case 2, disks 4, carriage 6, and a positioning motor (voice coil motor) 7. The disks 4 are rotatable about a spindle 3. The carriage 6 are turnable about a pivot 5. The positioning motor (voice coil motor) 7 is implemented to actuate the carriage 6, etc. It should be understood that the case 2 is typically sealed; the case 2 is illustrated without a cover to illustrate all of the features therein.

The carriage 6 typically includes more than one carriage arms 8. A suspension 10 is mounted on the distal end portion of each arm 8. A slider (illustrated below in FIG. 2), which constitutes one or more read/write heads, is provided on the distal end portion of the suspension 10. In a state where each disk 4 rotates at high speed, an air bearing is formed between the disk and the slider 11 as air flows in between the disk 4 and slider 11. If the carriage 6 is turned by the positioning motor 7, the suspension 10 moves radially relative to the disk 4. Thereupon, the slider 11 moves to a desired track of the disk 4.

Figure 2:
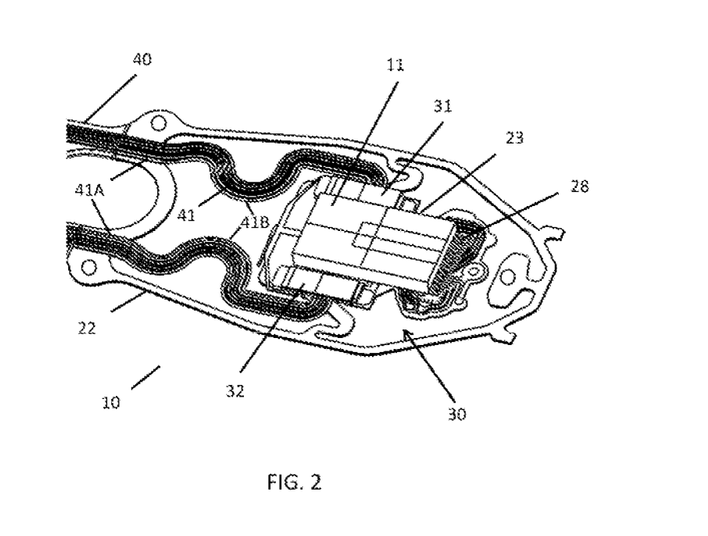
FIG. 2 is a top perspective view of the microactuator mounting section of a suspension, in accordance with an embodiment of the disclosure.

FIG. 2 is a perspective view of a microactuator mounting section 23 of a suspension 10. The suspension 10 can be supported by a load beam (not shown). The suspension can include a flexure 22. The flexure 22 supports the head gimbal assembly, which includes a mounting section 23. A slider 11, which constitutes a read/write head, is provided on the suspension 10, at the mounting section 23. In some embodiments, the slider 11 includes magnetoresistive (MR) elements 28, which are capable of conversion between magnetic and electrical signals. The MR elements 28 are disposed on an end portion of the slider 11 that constitutes the magnetic head. These elements 28 serve to access data, that is, write or read data to or from the disk (shown in FIG. 1).

The microactuator mounting section 23 includes a gimbal portion 30, formed on the distal end portion of the flexure 22. Microactuator elements 31 and 32 are disposed individually on the opposite sides of the slider 11 on the gimbal portion 30. Microactuator elements 31 and 32, according to some embodiments, are formed of piezoelectric plates of lead zirconate titanate ("PZT") or the like. The microactuator elements 31 and 32 have the function of pivoting the slider 11 in the sway direction by means of a structure. Attaching the microactuator elements 31 and 32 onto the tongue on the same side as the slider 11 simplifies the manufacturing process. Furthermore, the position of the microactuator elements 31 and 32 allows for less stringent requirements on the adhesive thickness control or vertical position control, as the microactuator is not in between the slider and the load beam, as in traditional cases.

The suspension 10 can be configured as a dual-stage-actuator (DSA) type, meaning two microactuator elements 31 and 32 mounted in the microactuator mounting section 23. It should be understood, any configurations of microactuator elements may be implemented herein. The microactuator mounting section 23 can support the microactuator elements 31 and 32 and the slider 11.

The flexure 22 includes a metal base 40. In some embodiments, the metal base 40 is formed of a stainless-steel plate. The suspension 10 also includes a conductive circuit portion 41 including one or more conductors, such as traces. The conductive circuit portion 41 includes a conductor that connects to the slider 11. The conductor can also connect to electrodes of the microactuator elements 31 and 32.

A majority of the length of the conductive circuit portion 41 is unsupported by the metal base 40. The conductive circuit portion 41 includes a first part 41A that overlaps with the metal base 40, and a second part 41B that does not overlap the metal base 40. The longer path of the second part 41B makes the second part 41B flexible. As a result, the conductive circuit portion 41 has a low contribution to the stiffness, and the configuration reduces the stiffness in comparison to traditional designs. This is discussed in greater detail with respect to FIG. 7.

Figure 3:
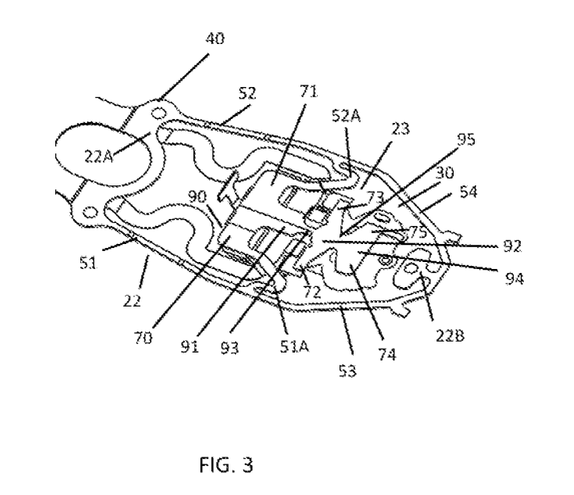
FIG. 3 is a bottom perspective view of the microactuator mounting section of a suspension, in accordance with an embodiment of the disclosure.

FIG. 3 is a bottom view of the microactuator mounting section 23 taken from the opposite side of the conductive circuit portion 41. The flexure 22 includes first and second stationary parts 22A and 22B, respectively. The metal base 40 of the flexure 22 includes a pair of first arms 51 and 52 and a pair of second arms 53 and 54. The first arms 51 and 52 connect with the first stationary part 22A. The second arms 53 and 54 connect with the second stationary part 22B. The pair of first arms 51 and 52 includes distal end portions 51A and 52A. The respective distal end portions 51A and 52A are U-shaped. The respective rear ends of the second arms 53 and 54 are adjacent to the distal end portions 51A and 52A. The conductive circuit portion 41 is supported at 41A at the first stationary part 22A and partially by the distal end portions 51A and 52A. In some embodiments, distal end portions 51A and 52A connected to tongue 90 within 30% of the slider length as measured from the dimple point.

The gimbal portion 30 of the flexure 22 includes a fixed first tongue portion 91, a movable second tongue portion 92, a movable third tongue portion 94, a first hinge portion 93, and a second hinge portion 95. The first hinge portion 93 is formed between the tongue portions 91 and 92. The second hinge portion 95 is formed between the tongue portions 92 and 94. First supporting portions 70 and 71 are formed on the gimbal portion 30. Specifically, the first supporting portions 70 and 71 connect with the first stationary part 22A of the flexure 22 through the first arms 51 and 52, respectively.

Moreover, the distal end portions 51A and 52A of the first arms 51 and 52 connect with the second stationary part 22B of the flexure 22 through the second arms 53 and 54, respectively. Thus, the first supporting portions 70 and 71 are supported on the stationary parts 22A and 22B by the first arms 51 and 52 and second arms 53 and 54, and can be elastically deformed relative to the load beam.

The microactuator elements 31 and 32 are secured to a pair of second supporting portions 72 and 73, respectively, formed on the gimbal portion 30. The first tongue portion 91 is formed between the first supporting portions 70 and 71, and the second tongue portion 92 between the second supporting portions 72 and 73. The first hinge portion 93 is formed between the first and second tongue portions 91 and 92. The second hinge portion 95 is formed between the second and third tongue portions 92 and 94. The first supporting portions 70 and 71, second supporting portions 72 and 73, third supporting portions 74 and 75, first, second and third tongue portions 91, 92 and 94, and hinge portions 93 and 95 all constitute a part of the metal base 40. The respective contours of these components are formed by, for example, etching, laser ablation, or other methods of forming and shaping metal. The first, second and third tongue portions 91, 92, 94 and hinge portions 93 and 95 constitute a tongue 90 configured to have the slider disposed (shown in FIG. 2) thereon.

Figure 4:
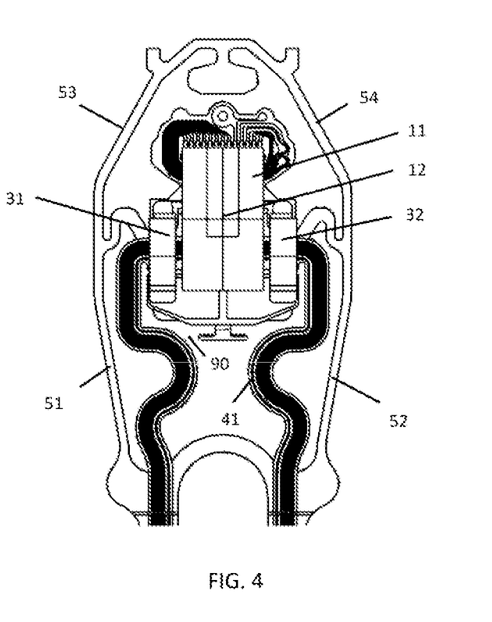
FIG. 4 is a plan view of the microactuator mounting section of a suspension, in accordance with an embodiment of the disclosure.

FIG. 4 is a plan view of the microactuator mounting section 23, in accordance with an embodiment of the disclosure. The tongue 90 includes a dimple point 12, which represents the point of alignment of the flexure assembly with a dimple of a load beam. In some embodiments, the dimple point 12 is on the same axis passing through the center of the dimple of a load beam and the same axis as the rotational axis of hinge portion 93. The length of the conductive circuit portion 41 unsupported by the metal base 40 is maximized by having the conductive circuit portion 41 connection to the tongue 90 near the dimple point 12. In some embodiments, the dimple point 12 is centered on the rotational axis of hinge portion 93. This connection also provides a lower contribution to the gimbal stiffness. In some embodiments, the conductive circuit portion 41 connects with the tongue 90 at a point that is within 30% of the slider length as measured from the dimple point 12. The metal base 40 connection to the tongue 90 is also nearby the dimple point 12. The configuration of the pair of first arms 51 and 52, and the second arms 53 and 54, and the tongue 90 minimizes the deflection of the tongue 90 when the suspension 10 is at different z-height.

Figure 7:
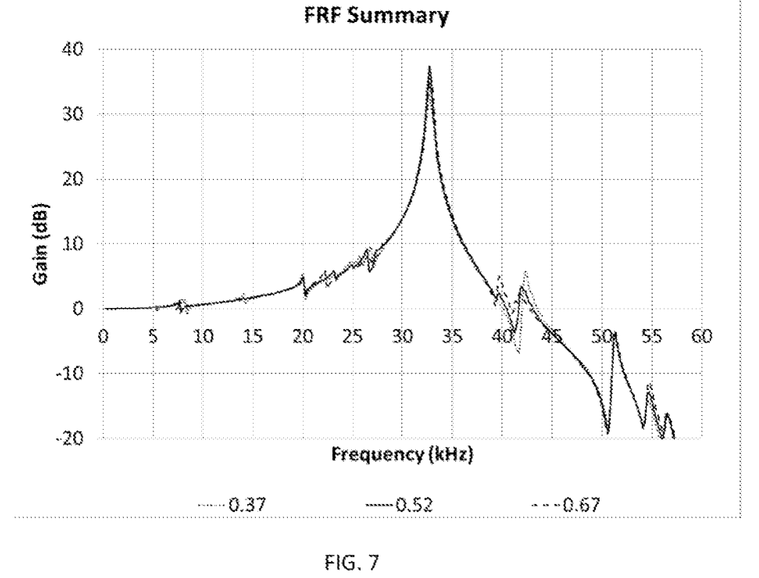
FIG. 7 is a graphical representation of a resonant frequency (FRF) of the suspension, in accordance with an embodiment of the disclosure.

The microactuator elements 31 and 32 can be relatively smaller than the slider 11, and are positioned at the leading edge side of the dimple point 12 for better mass balancing. In some embodiments, each of the microactuator elements 31 and 32 can be 0.051×0.23×0.63 mm in dimension. The slider 11 has a dimension of 0.16×0.7×1.235 mm. This configuration ensures better mass balancing of the tongue 90 for low gain of sway and baseplate torsion modes. Referring momentarily to FIG. 7, the resonant frequency (FRF) of the suspension for z-height variation of +/−0.15 mm is illustrated herein. In some embodiments, the microactuator length is configured to be no more than 60% of the slider length. The gimbal portion 30 is configured to mount the microactuator such that the position of the microactuator is within 30% of the slider length as measured from the dimple point 12.

Figure 5:
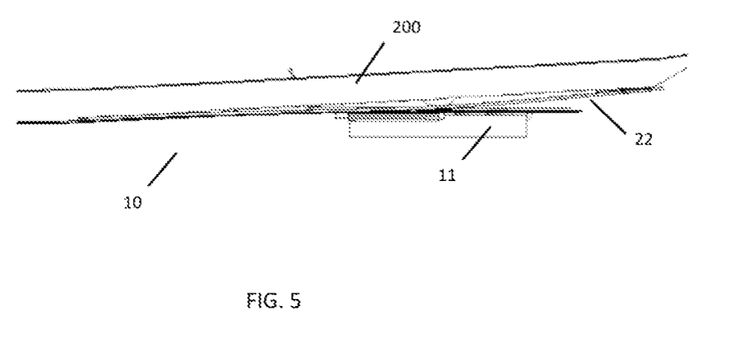
FIG. 5 is a side view of a load beam of a suspension, in accordance with an embodiment of the disclosure, during a low excitation of the torsion mode.
Figure 6:
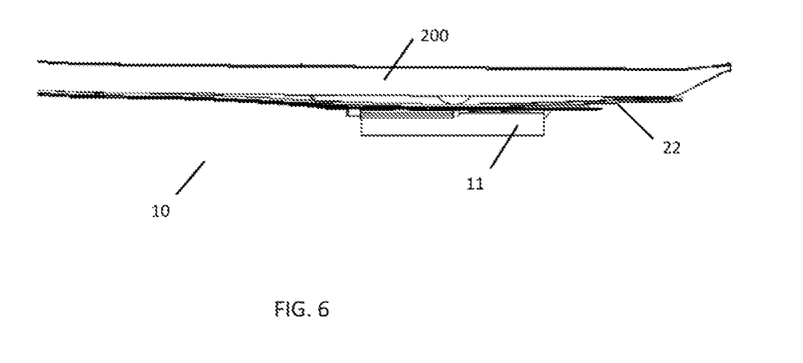
FIG. 6 is a side view of a load beam of a suspension, in accordance with an embodiment of the disclosure, during a high excitation of the torsion mode.

FIG. 5 is a side view of a load beam 200 of the suspension 10 when it is at low z-height position (closer to disk), in accordance with an embodiment of the disclosure. The load beam 200 includes a dimple. FIG. 6 is a side view of a load beam 200 of the suspension 10 when it is at high z-height (away from disk), in accordance with an embodiment of the disclosure. As illustrated, the flexure 22 is disposed along the load beam 200. The slider 11 is connected to the flexure 22, as detailed above. In the disclosed configuration, the stationary part 22A and 22B together with the load beam 200 has a different angle with respect to disk at different z-height while the slider remains parallel to the disk under flying condition, as if the load beam 200 is "rotated" about dimple. Because of the arm 51A, 52A and circuit portion 41B are connected to the tongue 90 nearby dimple point 12, the tongue 90 has minimal structural deflection at different z-height. In other words, the tongue 90 is able to remain significantly horizontal despite the bending of the load beam 200.

The disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A flexure assembly comprising:
   a gimbal portion configured to receive a slider, the gimbal portion includes a first surface and a second surface which is opposite to the first surface, the gimbal portion is configured to receive the slider on the second surface;
   a pair of microactuator elements, each of the pair of microactuator elements are disposed on the second surface on a respective side of the slider and includes a first end portion and a second end portion, and the microactuator elements are mounted to the second surface;
   a tongue of the gimbal portion on which the slider is mounted;
   a proximate pair of first supporting portions and a distal pair of second supporting portions of the gimbal portion, to which a pair of end portions are individually secured to the tongue; and
   a conductive circuit portion unsupported from a first stationary part and beyond the proximate pair of first supporting portions, the conductive circuit portion first connects with a proximal side of the tongue at a point that is within a length of the slider.

2. The flexure assembly of claim 1, wherein the conductive circuit portion includes a conductor connected to an element of the slider.

3. The flexure assembly of claim 2, wherein the conductor connects to electrodes of the pair of microactuator elements.

4. The flexure assembly of claim 1, wherein the proximate pair of first supporting portions are individually secured and supported by the first stationary part.

5. The flexure assembly of claim 1, wherein the distal pair of second supporting portions are individually secured and supported by a second stationary part.

6. The flexure assembly of claim 1, wherein the pair of end portions are U-shaped.

7. The flexure assembly of claim 1, wherein the tongue includes a fixed first tongue portion, and a movable second tongue portion.

8. The flexure assembly of claim 7, wherein the tongue further includes a first hinge portion formed between the fixed first tongue portion and the moveable second tongue portion.

9. The flexure assembly of claim 1, wherein the first surface faces a load beam, and the slider, the microactuator elements, and the conductive circuit portion are all disposed on the second surface.

10. A disk drive suspension comprising:
a load beam; and
a flexure assembly, including:
a gimbal portion on which a slider is mounted, the gimbal portion including a first surface and a second surface which is opposite to the first surface, wherein the slider is mounted on the second surface;
a pair of microactuator elements, each of the pair of microactuator elements disposed on a respective side of the slider and includes a first end portion and a second end portion, and the microactuator elements mounted to the second surface;
a tongue of the gimbal portion on which the slider is mounted, the tongue including a dimple which represents the center of the tongue;
a proximate pair of first supporting portions and a distal pair of second supporting portions of the gimbal portion, to which a pair of end portions are individually secured to the tongue; and
a conductive circuit portion unsupported from a first stationary part and beyond the proximate pair of first supporting portions, the conductive circuit portion first connects with a proximal side of the tongue at a point that is within a length of the slider.

11. The disk drive suspension of claim 10, wherein the conductive circuit portion includes a conductor connected to an element of the slider.

12. The disk drive suspension of claim 11, wherein the conductor connects to electrodes of the pair of microactuator elements.

13. The disk drive suspension of claim 10, wherein the first surface faces the load beam, and the slider, the microactuator elements, and the conductive circuit portion are all disposed on the second surface.

14. The disk drive suspension of claim 10, wherein the proximate pair of first supporting portions are individually secured and supported by the first stationary part.

15. The disk drive suspension of claim 10, wherein the distal pair of second supporting portions are individually secured and supported by a second stationary part.

16. The disk drive suspension of claim 10, wherein the pair of end portions are U-shaped.

17. The disk drive suspension of claim 10, wherein the tongue includes a fixed first tongue portion, and a movable second tongue portion.

18. The disk drive suspension of claim 17, wherein the tongue further includes a first hinge portion formed between the fixed first tongue portion and the movable second tongue portion.

* * * * *